Aug. 14, 1923.
W. STUBBS
1,464,782
ELECTRIC HEATING APPLIANCE OF THE IMMERSED ELEMENT TYPE
Filed Jan. 31, 1922
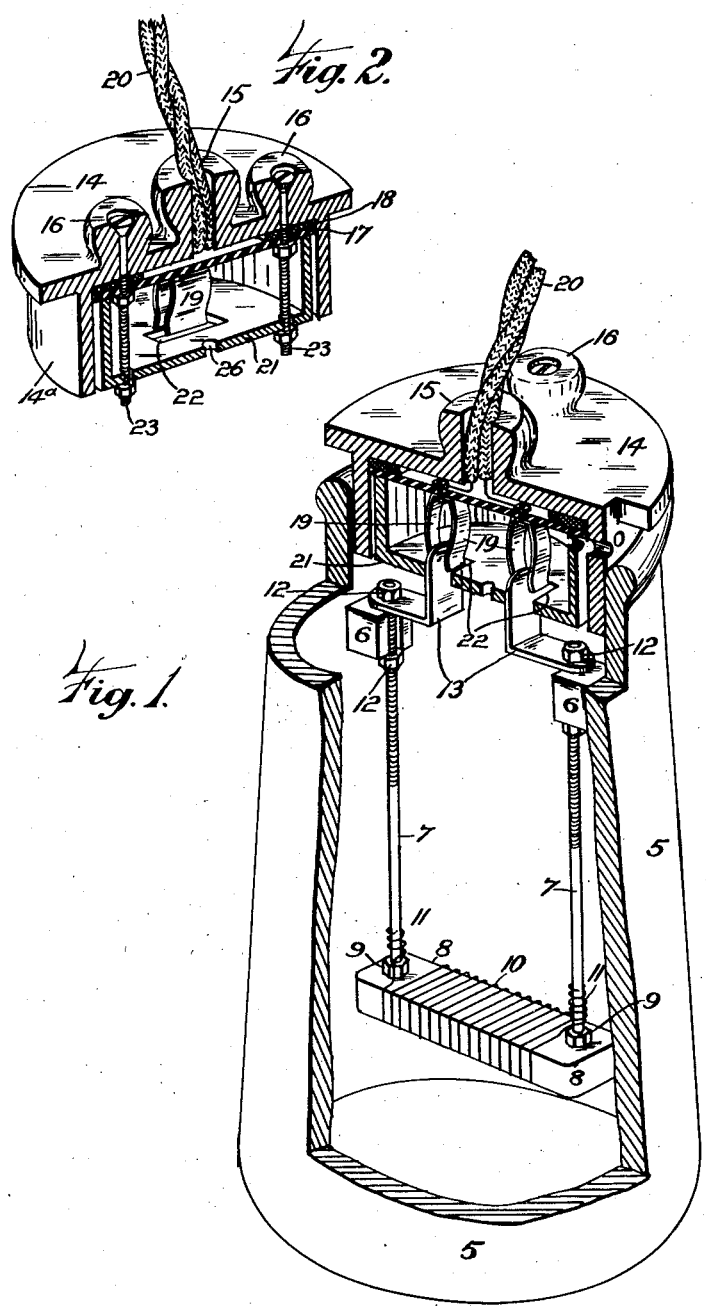
Inventor
W. Stubbs,
By Marks & Clerk
Attys.

Patented Aug. 14, 1923.

1,464,782

UNITED STATES PATENT OFFICE.

WALTER STUBBS, OF MASCOT, NEW SOUTH WALES, AUSTRALIA.

ELECTRIC HEATING APPLIANCE OF THE IMMERSED-ELEMENT TYPE.

Application filed January 31, 1922. Serial No. 533,058.

*To all whom it may concern:*

Be it known that I, WALTER STUBBS, subject of the King of Great Britain and Ireland, residing at Picton Street, Mascot, in the State of New South Wales, Commonwealth of Australia, have invented new and useful Improvements in Electric Heating Appliances of the Immersed-Element Type, of which the following is a specification.

Present day appliances that are used for electrically heating water or other liquids or semi-liquids are varied in design but the heating element itself is generally enclosed and is not brought into direct contact with the liquid to be heated. The result is therefore that a great deal of heat is radiated thus considerably reducing the thermal efficiency of the appliances.

The main object of this invention is to provide a simple and efficient heating appliance, in which the heating element is brought into direct contact with the liquid or semi-liquid to be heated. With these objects in view it will be seen that the appliance is preferably for use with alternating electric current and as the liquid to be heated will necessarily become electrified it is imperative that the vessel, container or tube should be made of electric non-conducting material or be completely insulated over its exterior surface. It is a further object of this invention to provide means whereby the liquid contents of the vessel or container cannot be poured out until the current is cut off those means also being utilized for making the electric connection.

In order to illustrate and describe my invention, I have selected one of the simplest forms of application, but the details of construction and design may be varied. The form selected consists of a vessel made of a suitable electric non-conducting material such as earthenware, having suitable projections or lugs on the inner wall, these projections being adapted to receive and securely maintain in position supporting rods, to the lower ends of each of which is fixed a bobbin of electric non-conducting material, upon which the heating element, consisting of high resistance wire or metal ribbon is spirally wound. Securely fixed to the upper ends of these rods are contact tongues A lid or cover for the vessel is provided, such lid or cover being made of earthenware or other suitable electric non-conducting material. Upon this lid or cover are upwardly projecting bosses, the centre boss having a passage through which a flexible wire may be passed. The outer bosses are provided with holes for screws by means of which a disc of electric non-conducting material, such as fibre is secured upon the underneath face of the lid. Upon this disc is mounted two metal inverted U shaped pieces forming contact clips with throats, adapted to receive the contact tongues that are secured to the upper ends of the rods supporting the bobbin, the flexible leads being connected to these contact clips. Between the disc upon which the clips are mounted, and the underside of the lid or cover is inserted a rubber or other suitable washer, the object being to prevent condensed moisture from being deposited on the electric flexible leads. The whole of the electric connections secured to the underside of the lid or cover are enclosed within an earthenware or other suitable box which is secured to the underside of the lid or cover by means of clamp nuts. Formed in the bottom of this box are two slots so placed as to lie immediately below the contact clips, the contact tongues passing upward through these slots into the throats of the contacts where they are gripped. The bottom of this box is perforated to enable the condensed moisture to escape back into the vessel.

Part of the wall of this box is cut away along the upper edge corresponding to a similar cut away part in the lid or cover thus forming a free outlet for the vapour or steam rising during the process of heating.

In order to discharge or empty the contents of the vessel, it is necessary to remove the lid or cover and in doing so the contact tongues become disengaged from the clip throats and the electrical circuit is broken, the removal of the lid or cover thus acting as an automatic switch or cut out.

A more detailed description of the invention will now be given and reference will be made to the accompanying sheet of drawings, in which:—

Fig. 1 is a sectional perspective view of the appliance within a specially constructed vessel or container, part of the vessel being cut away to expose the internal arrangement, while the lid and its attachments are shown partly in section.

Fig. 2 is a sectional perspective view of the lid and its attachments the section being taken on a line at right angles to that shown in Fig. 1.

The vessel or container 5 may be made of earthenware or other suitable electric non-conducting material and will be provided with internal lugs 6 that are shaped so as to form vertical grooves to accommodate the upper ends of the metal rods 7. To the lower extremities of these rods 7 is rigidly secured a bobbin 8, of any suitable shape and composed of a suitable electric non-conducting material, by means of the nuts 9. Upon this bobbin 8 is spirally wound a length of any high resisting metal 10. The ends of this wire or ribbon 10 are electrically connected to the rods 7 as shown at 11. The upper ends of the rods 7 are threaded to engage with nuts 12 by means of which the rods are held in position within the grooves in the lugs 6. The upper pair of nuts 12 are also utilized for the purpose of securing the L shaped contact tongues 13 in position upon the rods 7. The vessel or container 5 is provided with a flanged lid 14 composed preferably of similar material to the vessel or container. Integral with the lid 14 are upwardly extending bosses or knobs 15 and 16. The bosses have central vertical passages through which screws may be passed for the purpose of securing an electric non-conducting disc 17 upon the underneath face of the lid. Interposed between the underneath face of the lid and the upper face of the disc 17 is a rubber or other suitable washer 18 for the purpose of making a water-tight joint between the disc and the lid. Rigidly secured to the under face of the disc 17 are two approximately U shaped metal clips 19, inverted and bent so that the said members thereof will form a throat to receive the contact tongues 13. A flexible lead 20 connected to any suitable source of supply is passed through a central vertical passage in the boss 15, the ends of such leads being electrically connected to the clips 19 in a manner that will be readily understood. In order to prevent the clips 19 from being exposed they are enclosed within a circular box 21 of similar material to the container. Formed in the bottom of this box 21 are two slots 22 so situated that they will lie parallel with the sides of the clips 19 in order that when the lid 14 is placed upon the top of the vessel 5 the tongues 13 will project through the slots into the throat of the clips thereby making electrical contact and completing the circuit. The box 21 will be rigidly secured within the vertical side walls of the lid by means of countersunk screws 23 passing through the knobs 16, lid 14, disc 17 and the bottom of the box and engaging with nuts 24.

The bottom of the box 21 is perforated at 25 in order to allow any moisture that may collect therein to escape into the vessel 5. In order to provide a means whereby vapour or steam may escape from the vessel, portion of the wall along the top edge of the box 21 may be cut away or perforated as shown at 26 and the upper vertical wall 14ᵃ of the lid 14 will be correspondingly perforated as at 27 while immediately above the perforations 27 the flange of the lid will be cut away as shown at 28.

I claim:—

1. An electric water heating appliance including in combination, a vessel, a closure for association therewith and adapted to be connected with a source of electricity, a heating element arranged in the vessel and consisting of conducting rods, a non-conducting bobbin supported thereby and a suitable high resisting wire wound upon the bobbin and coacting means on the rods and the closure whereby the element is placed in the electric circuit when the closure is arranged in position upon the vessel.

2. In an electric water heating appliance as claimed in claim 1, wherein the coacting means consists of contact pieces suspended from the closure, contact tongues mounted on the upper ends of the rods and engageable with the contact pieces on the closure, and a non-conducting casing carried by the underside of the lid and forming a chamber and provided with spaced openings through which the tongues project.

3. A heating appliance of the character described including in combination, a vessel of non-conducting material provided with a single opening, a heating element mounted in the vessel including opposed rods, a non-conducting bobbin supported at the lower ends of the rods, a resistance wire wound about the bobbin and connected with the rods, contact tongues mounted on the upper ends of the rods and projecting partly through the opening, a removable lid adapted for connection with the source of electricity, a casing carried by the underside of the lid forming a chamber and provided with spaced openings through which the tongues project, contact pieces suspended within the chamber for engagement with the tongues upon the application of the lid for closing the circuit through the element and the casing and lid being provided with vapor exhaust openings, substantially as and for the purposes described.

In testimony whereof, I have signed my name to this specification.

WALTER STUBBS.